(12) United States Patent
Hamamoto et al.

(10) Patent No.: US 10,180,277 B2
(45) Date of Patent: Jan. 15, 2019

(54) VEHICLE AIR CONDITIONER

(71) Applicants: JAPAN CLIMATE SYSTEMS CORPORATION, Hiroshima (JP); Panasonic Corporation, Osaka (JP)

(72) Inventors: Hiroshi Hamamoto, Hiroshima (JP); Kohei Fukawatase, Hiroshima (JP); Yoshihiko Otake, Hiroshima (JP); Kou Komori, Nara (JP); Subaru Matsumoto, Tochigi (JP)

(73) Assignees: Japan Climate Systems Corporation, Hiroshima (JP); Panasonic Corporation, Osaka (JP)

( * ) Notice: Subject to any disclaimer, the term of this patent is extended or adjusted under 35 U.S.C. 154(b) by 354 days.

(21) Appl. No.: 15/018,092

(22) Filed: Feb. 8, 2016

(65) Prior Publication Data
US 2016/0153696 A1 Jun. 2, 2016

Related U.S. Application Data

(63) Continuation of application No. PCT/JP2014/004109, filed on Aug. 6, 2014.

(30) Foreign Application Priority Data

Aug. 9, 2013 (JP) .................................. 2013-166119

(51) Int. Cl.
*B60H 1/32* (2006.01)
*F25D 21/12* (2006.01)
(Continued)

(52) U.S. Cl.
CPC ....... *F25D 21/125* (2013.01); *B60H 1/00328* (2013.01); *B60H 1/00921* (2013.01);
(Continued)

(58) Field of Classification Search
CPC ............ B60H 1/00328; B60H 1/00921; B60H 1/3213; B60H 2001/3282; F25B 11/74;
(Continued)

(56) References Cited

U.S. PATENT DOCUMENTS

| | | | |
|---|---|---|---|
| 5,385,030 | A | 1/1995 | Kitagawa et al. |
| 2003/0037562 | A1 | 2/2003 | Honda et al. |

(Continued)

FOREIGN PATENT DOCUMENTS

| | | |
|---|---|---|
| DE | 10 2012 203 564 A1 | 9/2012 |
| JP | 6-281280 A | 10/1994 |

(Continued)

OTHER PUBLICATIONS

International Search Report for corresponding International Application No. PCT/JP2014/004109 dated Nov. 11, 2014.
(Continued)

*Primary Examiner* — Jonathan Bradford
(74) *Attorney, Agent, or Firm* — Renner, Otto, Boisselle & Sklar, LLP

(57) ABSTRACT

An exterior heat exchanger is provided with first to fourth paths. The flow rate of the air being blown by an exterior blower to pass through the first path closer to a refrigerant inlet of the exterior heat exchanger is set to be higher than that of the air being blown by the exterior blower to pass through the fourth path closer to a refrigerant outlet of the exterior heat exchanger.

7 Claims, 9 Drawing Sheets

(51) Int. Cl.
*B60H 1/00* (2006.01)
*F25B 13/00* (2006.01)
*F25D 21/00* (2006.01)
*F25D 21/02* (2006.01)

(52) U.S. Cl.
CPC ........... *B60H 1/3213* (2013.01); *F25B 13/00* (2013.01); *F25D 21/004* (2013.01); *F25D 21/02* (2013.01); *B60H 2001/3282* (2013.01)

(58) Field of Classification Search
CPC ........ F25B 11/77; F25B 47/02; F25B 47/022; F25B 47/025; F25B 2700/11
See application file for complete search history.

(56) References Cited

U.S. PATENT DOCUMENTS

2004/0206490 A1* 10/2004 Katoh .................. F25B 39/02
165/174

2012/0227428 A1 9/2012 Yokoo et al.
2014/0137592 A1 5/2014 Matsumoto et al.

FOREIGN PATENT DOCUMENTS

| JP | 9-105560 A | 4/1997 |
| JP | 11-141920 A | 5/1999 |
| JP | 2000-171129 A | 6/2000 |
| JP | 2010-111222 A | 5/2010 |
| JP | 2010-236709 A | 10/2010 |
| JP | 2012-254725 A | 12/2012 |
| JP | 2013-126858 A | 6/2013 |
| WO | WO 2013/008464 A1 | 1/2013 |

OTHER PUBLICATIONS

Form PCT/ISA/237 for corresponding International Application No. PCT/JP2014/004109 dated Nov. 11, 2014.

* cited by examiner

VEHICLE AIR CONDITIONER

CROSS-REFERENCE TO RELATED APPLICATION

This is a continuation of International Application No. PCT/JP2014/004109 filed on Aug. 6, 2014, which claims priority to Japanese Patent Application No. 2013-166119 filed on Aug. 9, 2013. The entire disclosures of these applications are hereby incorporated by reference.

BACKGROUND

The present disclosure relates to a vehicle air conditioner including a heat pump device which performs heating and defrosting modes of operation.

A vehicle air conditioner with a heat pump device has been mounted on a car and other kinds of vehicles (see, for example, Japanese Unexamined Patent Publication No. 2010-111222). The heat pump device includes a compressor, an interior heat exchanger, an expansion valve, and an exterior heat exchanger. An interior fan to blow air toward the interior heat exchanger is provided inside the vehicle cabin, and an exterior fan to blow air toward the exterior heat exchanger is provided outside the vehicle cabin.

During heating, the interior heat exchanger functions as a radiator, and the exterior heat exchanger functions as a heat absorber. If frost is formed on the exterior heat exchanger during heating, the operation modes are switched into a defrosting operation mode to supply a high-temperature refrigerant to the exterior heat exchanger. According to Japanese Unexamined Patent Publication No. 2010-111222, the exterior fan is stopped during the defrosting mode of operation, and when the defrosting mode of operation ends, the airflow rate of the exterior fan is maximized to blow off the water deposited on the exterior heat exchanger.

In general, the exterior heat exchanger is rarely frosted uniformly, if ever, and in most cases, has a region that frosts easily during heating and a region that does not frost easily during heating. Furthermore, depending on the configuration and operating state of the heat pump device, sometimes more heat may be dissipated, and frost may be formed more easily, in a region closer to a refrigerant outlet of the exterior heat exchanger than in a region closer to a refrigerant inlet thereof.

Once the exterior heat exchanger is frosted albeit just partially, the frost tends to grow from there and eventually cover the exterior heat exchanger entirely. That is why if the formation of frost on such an easily frostable region can be delayed as much as possible, the heating performance capacity is improvable.

In view of the foregoing background, it is therefore an object of the present disclosure to improve the heating capacity, and eventually increase the occupant's comfortableness, by delaying the formation of frost on such a region closer to the refrigerant outlet of the exterior heat exchanger as much as possible if the region closer to the refrigerant outlet tends to frost more easily during heating operation than another region closer to the refrigerant inlet of the exterior heat exchanger.

SUMMARY

To achieve this object, according to the present disclosure, if a region closer to the refrigerant outlet of the exterior heat exchanger frosts more easily than another region closer to the refrigerant inlet thereof, the air being blown through a path leading to the refrigerant inlet of the exterior heat exchanger has its flow rate increased during the heating mode of operation.

A first aspect of the present disclosure is a vehicle air conditioner comprising:

a heat pump device including a compressor which compresses a refrigerant, an interior heat exchanger provided inside a vehicle cabin, an exterior heat exchanger provided outside the vehicle cabin, an expansion valve, and an exterior blower which blows air toward the exterior heat exchanger, the heat pump device being formed by connecting together the compressor, the interior heat exchanger, the expansion valve, and the exterior heat exchanger via refrigerant piping; and an air-conditioning controller configured to control the heat pump device, the heat pump device being configured to be switched by the air-conditioning controller between multiple operation modes including a heating operation mode and a defrosting operation mode, In this air conditioner, the exterior heat exchanger includes a plurality of heat-transfer pipes which are arranged in line in a predetermined direction and a header tank which is connected to an end of the heat-transfer pipes and which extends in the direction in which the heat-transfer pipes are arranged in line, the header tank has a refrigerant inlet portion and a refrigerant outlet portion which are provided along the length of the header tank so as to be spaced apart from each other, and a partition which partitions the heat-transfer pipes into a plurality of paths such that a refrigerant flow that goes from the refrigerant inlet portion toward the refrigerant outlet portion is formed, and the flow rate of the air being blown by the exterior blower to pass through one of the paths closer to the refrigerant inlet portion of the exterior heat exchanger is higher than the flow rate of the air being blown by the exterior blower to pass through another one of the paths closer to the refrigerant outlet portion of the exterior heat exchanger.

According to this configuration, in the heating operation mode, the exterior heat exchanger absorbs heat to be frosted. In this case, depending on the configuration and operating state of the heat pump device, sometimes a path closer to the refrigerant outlet portion of the exterior heat exchanger may frost more easily than another path closer to the refrigerant inlet portion thereof. During the heating mode of operation, the flow rate of the air being blown by the exterior blower to pass through a path closer to the refrigerant inlet portion of the exterior heat exchanger is higher than that of the air being blown to pass through a path closer to the refrigerant outlet portion thereof. Thus, a greater quantity of heat is exchanged on the path closer to the refrigerant inlet portion of the exterior heat exchanger, and the formation of frost on the path closer to the refrigerant outlet portion of the exterior heat exchanger may be delayed. As a result, the frost is prevented from growing over a broad range of the exterior heat exchanger.

As a means for varying the flow rate of the air flowing through the path closer to the refrigerant inlet portion of the exterior heat exchanger from that of the air flowing through the path closer to the refrigerant outlet portion thereof, the structure of a portion of the vehicle body where the exterior heat exchanger is arranged, the layout of the exterior blower, or the air blowing capacity of the exterior blower may be used, for example.

A second aspect of the present disclosure is an embodiment of the first aspect of the present disclosure. In the second aspect, the heat-transfer pipes of the exterior heat exchanger are arranged in line horizontally, and the header tank extends horizontally, the exterior blower includes a first fan and a second fan which are arranged horizontally along an air passage plane of the exterior heat exchanger so as to be located closer to the refrigerant outlet portion and the refrigerant inlet portion, respectively, and the airflow rate of the second fan is set to be higher than the airflow rate of the first fan.

That is to say, if first and second fans are provided, these fans are configured such that the air passing through a path closer to the refrigerant inlet portion of the exterior heat exchanger flows at the higher rate. As a result, the function and effect of the first aspect of the present disclosure are achieved reliably. In addition, by changing the airflow rates of the first and second fans, the noise is reducible with the resonance of these fans reduced. As a means for changing the airflow rates of the first and second fans, those fans may have mutually different numbers of blades or different diameters, for example.

In addition, the water collected outside the path closer to the refrigerant inlet portion of the exterior heat exchanger during the defrosting mode of operation may be drained quickly.

A third aspect of the present disclosure is an embodiment of the second aspect of the present disclosure. In the third aspect, the vehicle air conditioner further comprises a frosting state detecting means for detecting a frosting state of the exterior heat exchanger, and the air-conditioning controller is configured to switch, if the frosting state detecting means senses, during the heating mode of operation, that the exterior heat exchanger is frosted, the operation modes of the heat pump device into a defrosting operation mode and to stop the first and second fans at the beginning of the defrosting mode of operation, and to activate the first and second fans independently of each other according to the degree of defrosting of the exterior heat exchanger during the defrosting mode of operation.

According to this configuration, by activating the first and second fans independently of each other according to the degree of defrosting of the exterior heat exchanger during the defrosting mode of operation, the water present outside the exterior heat exchanger may be drained efficiently, thus improving the heating performance when frosting and defrosting occur recurrently during its operation.

A fourth aspect of the present disclosure is an embodiment of the third aspect of the present disclosure. In the fourth aspect, the frosting state detecting means functions as an inlet-side refrigerant temperature detecting means for detecting a refrigerant temperature state in a region closer to the refrigerant inlet portion of the exterior heat exchanger, and the air-conditioning controller is configured to activate the second fan when the refrigerant temperature detected by the inlet-side refrigerant temperature detecting means exceeds a first predetermined temperature and then stop the second fan, and to activate the first fan when the refrigerant temperature detected by the inlet-side refrigerant temperature detecting means exceeds a second predetermined temperature that is higher than the first predetermined temperature.

According to this configuration, since the inlet-side refrigerant temperature detecting means for detecting the refrigerant temperature state in a region closer to the refrigerant inlet portion of the exterior heat exchanger is used, the frosting in the exterior heat exchanger is also detectable by that detecting means, and therefore, a system may be established at a reduced cost.

A fifth aspect of the present disclosure is an embodiment of the third aspect of the present disclosure. In the fifth aspect, the frosting state detecting means functions as an outlet-side refrigerant temperature detecting means for detecting a refrigerant temperature state in a region closer to the refrigerant outlet portion of the exterior heat exchanger, and the air-conditioning controller is configured to activate the second fan when the refrigerant temperature detected by the outlet-side refrigerant temperature detecting means exceeds a first predetermined temperature and then stop the second fan, and to activate the first fan when the refrigerant temperature detected by the outlet-side refrigerant temperature detecting means exceeds a second predetermined temperature that is higher than the first predetermined temperature.

According to this configuration, by detecting the refrigerant temperature state in a region closer to the refrigerant outlet portion of the exterior heat exchanger, the frosting state of the path of the exterior heat exchanger is estimable accurately.

A sixth aspect of the present disclosure is an embodiment of the third aspect of the present disclosure. In the sixth aspect, the frosting state detecting means functions as a clocking means for recording the amount of time that has passed since the defrosting mode of operation was started, and the air-conditioning controller is configured to activate the second fan when the clocking means senses the amount of time that has passed since the defrosting mode of operation was started exceed a first predetermined amount of time and then stop the second fan, and to activate the first fan when the clocking means senses the amount of time that has passed since the defrosting mode of operation was started exceed a second predetermined amount of time that is longer than the first predetermined amount of time.

That is to say, the longer the amount of time that has passed since the defrosting mode of operation was started, the smaller the amount of frost formed on each path of the exterior heat exchanger. That is why there is a correlation between the frosting state of each path of the exterior heat exchanger and the amount of time that has passed since the defrosting mode of operation was started. By using such a clocking means for recording the amount of time that has passed since the defrosting mode of operation was started, the frosting state may be detected based on the correlation without detecting the refrigerant temperature or any other parameter, and the first and second fans are controllable at a reduced cost adaptively to the frosting state.

A seventh aspect of the present disclosure is an embodiment of the first aspect of the present disclosure. In the seventh aspect, the exterior blower is comprised of a single fan, the fan being arranged such that the center of the fan is offset toward the refrigerant inlet of the exterior heat exchanger.

According to this configuration, when the exterior blower is activated during the heating mode of operation, the flow rate of the air being blown through the path closer to the refrigerant inlet portion of the exterior heat exchanger becomes higher than that of the air being blown through the path closer to the refrigerant outlet portion thereof. This thus allows for setting the quantity of heat exchanged to be higher on the path closer to the refrigerant inlet portion of the exterior heat exchanger.

In addition, this also allows for blowing off reliably the water present outside the path closer to the refrigerant inlet portion of the exterior heat exchanger, and thus supplying quickly a high-temperature refrigerant to the path closer to the refrigerant outlet portion of the exterior heat exchanger.

An eighth aspect of the present disclosure is an embodiment of any one of the first through seventh aspects of the present disclosure. In the eighth aspect, the air-conditioning controller is configured to activate the exterior blower before the operation modes of the heat pump device are switched from the defrosting operation mode into the heating operation mode and after it has been estimated that the frost on the exterior heat exchanger has melted.

According to this configuration, the water present outside the exterior heat exchanger may be blown off in a late stage of the defrosting mode of operation. This improves the heating performance while frosting and defrosting occur recurrently during the operation.

A ninth aspect of the present disclosure is an embodiment of any one of the first through eighth aspects of the present disclosure. In the ninth aspect, the air-conditioning controller controls the heat pump device such that when the heat pump device operates in the defrosting operation mode, the exterior blower has a maximum airflow rate.

According to this configuration, by setting the airflow rate of the exterior blower to be maximum during the defrosting mode of operation, the water present outside the exterior heat exchanger may be blown off reliably.

A tenth aspect of the present disclosure is an embodiment of the first aspect of the present disclosure. In the tenth aspect, the vehicle air conditioner further comprises a frosting state detecting means for detecting a frosting state of the exterior heat exchanger, the exterior blower is comprised of a single fan, and the air-conditioning controller performs control so as to switch, if the frosting state detecting means senses, during the heating mode of operation, that the exterior heat exchanger is frosted, the operation modes of the heat pump device into a defrosting operation mode and to stop the fan at the beginning of the defrosting mode of operation, and to maximize the airflow rate of the fan before the operation modes of the heat pump device are switched from the defrosting operation mode into the heating operation mode and after it has been estimated that the frost on the exterior heat exchanger has melted.

According to this configuration, the water present outside the exterior heat exchanger may be blown off in a late stage of the defrosting mode of operation. This improves the heating performance while frosting and defrosting occur recurrently during the operation.

An eleventh aspect of the present disclosure is an embodiment of any one of the first through tenth aspects of the present disclosure. In the eleventh aspect, the heat pump device includes a first interior heat exchanger and a second interior heat exchanger which is arranged upstream of the first interior heat exchanger in an airflow direction, and the heat pump device makes the first and second interior heat exchangers function as radiators during the heating mode of operation.

According to this configuration, the air-conditioning air is heated by the first and second interior heat exchangers, thus improving the heating capacity.

According to the first aspect of the present disclosure, the flow rate of the air being blown by the exterior blower to pass through the path closer to the refrigerant inlet portion of the exterior heat exchanger is set to be higher than that of the air being blown to pass through the path closer to the refrigerant outlet portion thereof such that the exterior blower is activated during the heating mode of operation. This thus allows for delaying the formation of frost on a region closer to the refrigerant outlet portion of the exterior heat exchanger if the region closer to the refrigerant outlet portion of the exterior heat exchanger tends to frost more easily during the heating mode of operation than a region closer to the refrigerant inlet portion thereof. Consequently, the heating capacity improves and the occupant's comfortableness increases.

According to the second aspect of the present disclosure, by setting the flow rate of the air passing through the path closer to the refrigerant inlet portion of the exterior heat exchanger to be relatively high when the first and second fans are provided, the water present outside the path closer to the refrigerant inlet portion of the exterior heat exchanger may be blown off so much as to finish defrosting in a shorter time while noise is reduced with the resonance of the two fans suppressed.

According to the third aspect of the present disclosure, the first and second fans are activated independently of each other according to the degree of defrosting of the exterior heat exchanger, thus allowing for draining efficiently the water present outside the exterior heat exchanger. This improves the heating performance, and eventually further increases the occupant's comfortableness, when frosting and defrosting occur recurrently during the operation.

According to the fourth aspect of the present disclosure, with the system implemented at a reduced cost by using the inlet portion-side refrigerant temperature detecting means for detecting the refrigerant temperature state in a region closer to the refrigerant inlet portion of the exterior heat exchanger, the first and second fans may be activated appropriately.

According to the fifth aspect of the present disclosure, the refrigerant temperature state in a region closer to the refrigerant outlet portion of the exterior heat exchanger is detected, thus allowing for estimating the frosting state of the path of the exterior heat exchanger accurately. In addition, the first and second fans may be activated even more appropriately.

According to the sixth aspect of the present disclosure, a clocking means for recording the amount of time that has passed since the defrosting mode of operation was started is used, thus allowing for controlling the first and second fans at a reduced cost adaptively to the frosting state of the exterior heat exchanger without detecting the refrigerant temperature or any other parameter.

According to the seventh aspect of the present disclosure, the fan is arranged so as to be offset toward a region closer to refrigerant inlet portion of the exterior heat exchanger, which allows for setting reliably the flow rate of the air being blown through a path leading to the refrigerant inlet portion to be higher during the heating mode of operation and blowing off reliably the water present outside the path closer to the refrigerant inlet portion during the defrosting mode of operation. This improves the heating performance, and eventually further increases the occupant's comfortableness, when frosting and defrosting occur recurrently during the operation.

According to the eighth aspect of the present disclosure, the exterior blower is activated before the operation modes are switched from the defrosting operation mode into the heating operation mode and after the frost formed on the exterior heat exchanger has melted, thus allowing for blowing off the water present outside the exterior heat exchanger in a late stage of the defrosting mode of operation. This improves the heating performance while frosting and defrosting occur recurrently during the operation.

According to the ninth aspect of the present disclosure, the airflow rate of the exterior blower is set to be maximum during the defrosting mode of operation, thus allowing for blowing off reliably the water present outside the exterior heat exchanger. This improves the heating performance while frosting and defrosting occur recurrently during the operation.

According to the tenth aspect of the present disclosure, the water present outside the exterior heat exchanger may be blown off in a late stage of the defrosting mode of operation. This improves the heating performance while frosting and defrosting occur recurrently during the operation.

According to the eleventh aspect of the present disclosure, the first and second interior heat exchangers are made to function as radiators during the heating mode of operation, thus improving the heating capacity.

DETAILED DESCRIPTION

Embodiments of the present disclosure will now be described in detail with reference to the accompanying drawings. Note that the following description of preferred embodiments is only an example in nature and is not intended to limit the scope, applications, or use of the present disclosure.

First Embodiment

Figure 1:
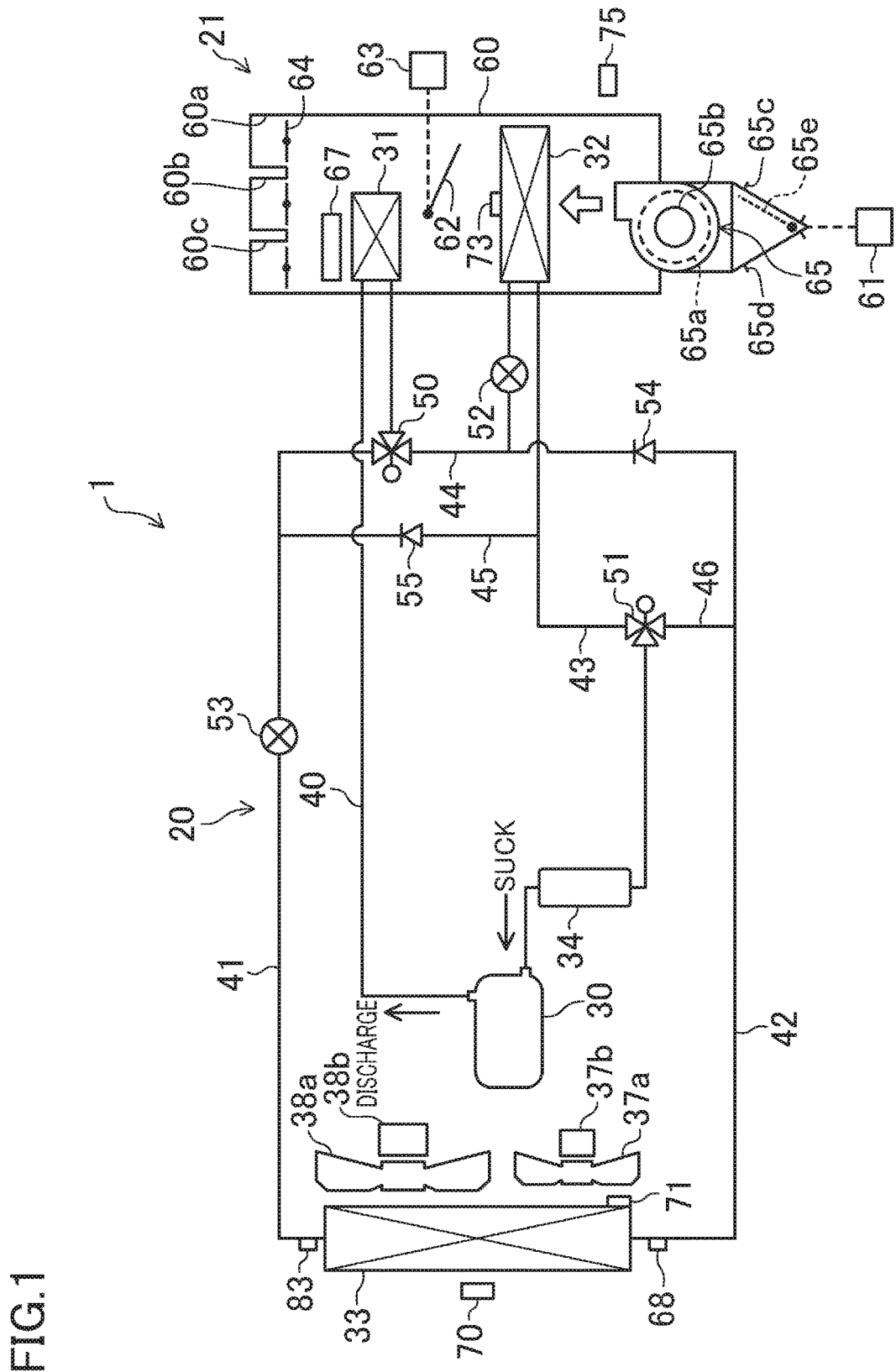
FIG. 1 is a diagram illustrating a general configuration for a vehicle air conditioner according to a first embodiment.

FIG. 1 illustrates a general configuration for a vehicle air conditioner 1 according to a first embodiment of the present disclosure. A vehicle on which the vehicle air conditioner 1 is mounted may be an electric car including a traction battery (not shown) and a traction motor (not shown).

This vehicle air conditioner 1 includes a heat pump device 20, an interior air-conditioning unit 21, and an air-conditioning controller 22 (shown in FIG. 2) that controls the heat pump device 20 and the interior air-conditioning unit 21.

The heat pump device 20 includes: a motor-driven compressor 30 that compresses a refrigerant; a downstream interior heat exchanger (first interior heat exchanger) 31 provided inside the vehicle cabin; an upstream interior heat exchanger (second interior heat exchanger) 32 provided upstream of the downstream interior heat exchanger 31 in an airflow direction inside the vehicle cabin; an exterior heat exchanger 33 provided outside the vehicle cabin; an accumulator 34; first to fourth main refrigerant pipes 40-43 and first to third branch refrigerant pipes 44-46 that connect all of these members 30 to 34 together; and first and second cooling fans 37a, 38a that form an exterior blower.

The motor-driven compressor 30 is an onboard compressor which has been known in the art, and is driven by an electric motor. The motor-driven compressor 30 may have its discharge rate per unit time varied by having its number of revolutions changed. The motor-driven compressor 30 is connected to the air-conditioning controller 22 so as to have its ON/OFF states switched and its number of revolutions controlled. The motor-driven compressor 30 is supplied with power from the traction battery.

The exterior heat exchanger 33 is provided near the front end of a motor room (corresponding to the engine room of an engine-driven vehicle) in a front portion of a vehicle, and is configured to catch the wind blowing against the vehicle traveling.

Figure 3:
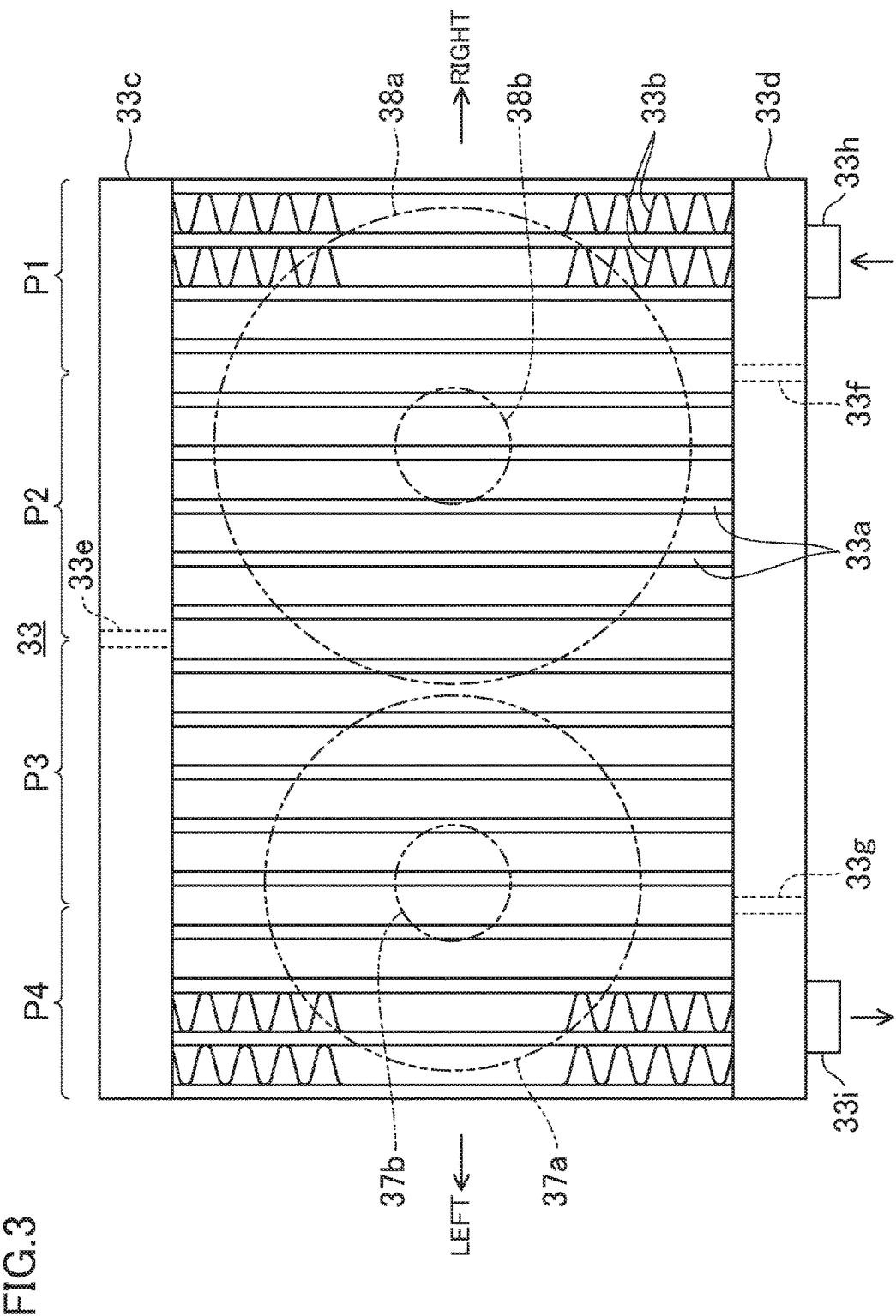
FIG. 3 is a rear view of an exterior heat exchanger as viewed from the rear side of the vehicle.

As shown in FIG. 3, the exterior heat exchanger 33 includes a plurality of heat-transfer pipes 33a, a plurality of fins 33b, an upper header tank 33c, and a lower header tank 33d. The heat-transfer pipes 33a run vertically and are arranged side by side laterally (i.e., horizontally) through the vehicle. Each of these heat-transfer pipes 33a has a cross section elongated in the direction in which the outside air passes through (i.e., the direction pointing from the front end to the rear end of the vehicle). Each pair of horizontally adjacent heat-transfer pipes 33a, 33a are horizontally spaced apart from each other to leave a space for disposing one of the fins 33b. That is to say, one of the fins 33b is provided between each pair of adjacent heat-transfer pipes 33a, 33a. The fin 33b may be a corrugated fin extending from the vicinity of the upper end of the heat-transfer pipe 33a to the vicinity of the lower end thereof.

The upper header tank 33c communicates with the respective upper ends of the heat-transfer pipes 33a. The upper header tank 33c has such a shape as extending laterally through the vehicle in the direction in which those heat-transfer pipes 33a are arranged side by side. A first partition plate (partition portion) 33e is provided inside, and in the middle of the length direction of, the upper header tank 33c. This first partition plate 33e is provided to partition the inside of the upper header tank 33c into a space on one side of the length direction and a space on the other side of the length direction.

The lower header tank 33d communicates with the respective lower ends of the heat-transfer pipes 33a. Just like the upper header tank 33c, the lower header tank 33d also has such a shape as extending laterally through the vehicle. A second partition plate (partition portion) 33f is provided on the right hand side of the middle of the length direction of, and inside, the lower header tank 33d, and a third partition plate (partition portion) 33g is provided on the left hand side of the middle. The second and third partition plates 33f and 33g are provided to partition the inside of the lower header tank 33d into three spaces in the length direction.

In addition, the lower header tank 33d is further provided with a refrigerant inlet pipe (refrigerant inlet portion) 33h to let a refrigerant flow into the lower header tank 33d and a refrigerant outlet pipe (refrigerant outlet portion) 33i to let the refrigerant flow out of the lower header tank 33d. These two pipes 33h and 33i are spaced apart from each other in the length direction of the lower header tank 33d. The refrigerant inlet pipe 33h communicates with the space of the lower header tank 33d on the right hand side of the second partition plate 33f, while the refrigerant outlet pipe 33i communicates with the space of the lower header tank 33d on the left hand side of the third partition plate 33g.

In this exterior heat exchanger 33, first through fourth paths P1-P4 are formed by the first, second, and third partition plates 33e, 33f, and 33g. Specifically, the first path P1 is comprised of a group of heat-transfer pipes 33a that communicate with the space of the lower header tank 33d on the right hand side of the second partition plate 33f. The second path P2 is comprised of a group of heat-transfer pipes 33a that communicate with the space of the lower header tank 33d on the left hand side of the second partition plate 33f and with the space of the upper header tank 33c on the right hand side of the first partition plate 33e. The third path P3 is comprised of a group of heat-transfer pipes 33a that communicate with the space of the lower header tank 33d on the right hand side of the third partition plate 33g and with the space of the upper header tank 33c on the left hand side of the first partition plate 33e. The fourth path P4 is comprised of a group of heat-transfer pipes 33a that communicate with the space of the lower header tank 33d on the left hand side of the third partition plate 33g.

The first path P1 serves as a path most upstream in the refrigerant flow direction, and is followed by the second, third and fourth paths P2, P3 and P4 in this order in the refrigerant flow direction. That is to say, the first, second, and third partition plates 33e, 33f and 33g are provided to classify the heat-transfer pipes 33a into the plurality of paths P1-P4 so as to form a refrigerant flow that goes from the refrigerant inlet pipe 33h toward the refrigerant outlet pipe 33i.

As shown in FIG. 1, the first and second cooling fans 37a and 38a are laterally arranged side by side on the front end of the vehicle and along the air passage plane so as to be located closer to the rear end of the vehicle than the exterior heat exchanger 33 is (i.e., downstream of the exterior heat exchanger 33 in the wind blowing against the vehicle travelling). The first and second cooling fans 37a and 38a are driven by first and second fan motors 37b, 38b, respectively, and are configured to blow air against the exterior heat exchanger 33 from the front end of the vehicle toward the rear end thereof.

As shown in FIG. 3, the first cooling fan 37a is arranged such that its center is offset leftward with respect to the lateral center of the exterior heat exchanger 33. On the other hand, the second cooling fan 38a is arranged such that its center is offset rightward with respect to the lateral center of the exterior heat exchanger 33.

The flow rate of the air being blown by the second cooling fan 38a is set to be higher than that of the air being blown by the first cooling fan 37a having the same number of revolutions. As a result, the flow rate of the air being blown by the second cooling fan 38a to pass through the paths P1 and P2 closer to the refrigerant inlet of the exterior heat exchanger 33 is set to be higher than that of the air being blown by the first cooling fan 37a to pass through the paths P3 and P4 closer to the refrigerant outlet of the exterior heat exchanger 33.

Specifically, in this embodiment, the diameter of the second cooling fan 38a is set to be larger than that of the first cooling fan 37a. This allows for reducing the resonance even when the first and second cooling fans 37a and 38a are activated simultaneously while providing the air speed distribution described above. As a result, the noise is reduced.

Note that the first and second cooling fans 37a and 38a do not have to have their airflow rate differentiated by adopting such a configuration in which their diameters are set to be different ones. Alternatively, their airflow rate may also be differentiated by providing mutually different numbers of blades for the first and second cooling fans 37a and 38a as well. Still alternatively, the first and second cooling fans 37a and 38a may also have their airflow rate differentiated even by adopting a vehicle structure in which it is more difficult for the air to flow into, or out of, the first cooling fan 37a than the second cooling fan 38a. Optionally, these configurations may also be adopted in any arbitrary combination.

The first and second fan motors 37b and 38b are connected to the air-conditioning controller 22 and configured to have their ON/OFF states switched and their number of revolutions controlled independently of each other. The numbers of revolutions may be changed into any of the three stages of Lo (low), Mi (middle) and Hi (highest) speeds. However, the numbers of revolutions may also be changed from one of two stages into the other or any one of four or more stages into another, or may even be changed stagelessly.

The first and second fan motors 37b, 38b are also supplied with electric power from the traction battery. Note that the first and second fan motors 37b, 38b may also blow air to a radiator (not shown) that cools a traction inverter, for example, and may also be activated even if air conditioning is not requested.

As shown in FIG. 1, the first main refrigerant pipe 40 connects together the discharge port of the motor-driven compressor 30 and the refrigerant inlet of the downstream interior heat exchanger 31. The second main refrigerant pipe 41 connects together the refrigerant outlet of the downstream interior heat exchanger 31 and the refrigerant inlet pipe 33h of the exterior heat exchanger 33. The third main refrigerant pipe 42 connects together the refrigerant outlet pipe 33g of the exterior heat exchanger 33 and the refrigerant inlet of the upstream interior heat exchanger 32. The fourth main refrigerant pipe 43 connects together the refrigerant outlet of the upstream interior heat exchanger 32 and the suction port of the motor-driven compressor 30.

The accumulator 34 is provided near the suction port of the motor-driven compressor 30 and halfway along the fourth main refrigerant pipe 43.

The first branch refrigerant pipe 44 branches from the second main refrigerant pipe 41, and is connected to the third main refrigerant pipe 42. The second branch refrigerant pipe 45 branches from the second main refrigerant pipe 41, and is connected to the fourth main refrigerant pipe 43. The third branch refrigerant pipe 46 branches from the third main refrigerant pipe 42, and is connected to the fourth main refrigerant pipe 43.

The heat pump device 20 further includes a first flow path switching valve 50, a second flow path switching valve 51, a first expansion valve 52, a second expansion valve 53, a first check valve 54, and a second check valve 55.

The first flow path switching valve 50 and the second flow path switching valve 51 are configured as electric three-way valves, and are controlled by the air-conditioning controller 22. The first flow path switching valve 50 is provided halfway along the second main refrigerant pipe 41, and the first branch refrigerant pipe 44 is connected to the valve 50. The second flow path switching valve 51 is provided halfway along the fourth main refrigerant pipe 43, and the third branch refrigerant pipe 46 is connected to the valve 51.

The first and second expansion valves 52 and 53 are electric types to be controlled by the air-conditioning controller 22 to operate in an opening direction and a closing direction. The degrees of opening of the first and second expansion valves 52 and 53 are ordinarily set according to the condition of the air-conditioning load, but may also be set to be any arbitrary degrees irrespective of the air-conditioning load.

The first expansion valve 52 is provided closer to the upstream interior heat exchanger 32 than the point of connection between the third main refrigerant pipe 42 and the first branch refrigerant pipe 44 is, i.e., provided on a refrigerant pipe leading to the refrigerant inlet of the upstream interior heat exchanger 32. On the other hand, the second expansion valve 53 is provided on the second main refrigerant pipe 41.

The first check valve 54 is provided on the third main refrigerant pipe 42, and is configured to allow the refrigerant to flow through the third main refrigerant pipe 42 from the exterior heat exchanger 33 toward the upstream interior heat exchanger 32 and to prevent the refrigerant from flowing in the reverse direction.

The second check valve 55 is provided on the second branch refrigerant pipe 45, and is configured to allow the refrigerant to flow through the second branch refrigerant pipe 45 from the fourth main refrigerant pipe 43 toward the second main refrigerant pipe 41 and to prevent the refrigerant from flowing in the reverse direction.

The interior air-conditioning unit 21 further includes a casing 60 housing the downstream and upstream interior heat exchangers 31 and 32, an air mix door (temperature controlling door) 62, an air mix door actuator 63 that drives the air mix door 62, blowout-mode switching doors 64, a blower 65, and a PTC heater (electric heater) 67.

The blower 65 is provided to select one of the air inside the vehicle cabin (inside air) or the air outside the vehicle cabin (outside air) and blow the selected air as air-conditioning air into the casing 60. The blower 65 includes a sirocco fan 65a and a blower motor 65b that drives the sirocco fan 65a in rotation. The blower motor 65b is connected to the air-conditioning controller 22 to have its ON/OFF states switched and its number of revolutions controlled. The blower motor 65b is also supplied with electric power from the traction battery.

The blower 65 is provided with an inside air inlet port 65c to introduce the inside air and an outside air inlet port 65d to introduce the outside air. Inside the blower 65, provided is an inside/outside air switching door 65e to open one of the inside and outside air inlet ports 65c and 65d and close the other. The blower 65 is further provided with an inside/outside air switching door actuator 61 to drive the inside/outside air switching door 65e. This inside/outside air switching door actuator 61 is controlled by the air-conditioning controller 22. The blower 65 is configured to have its air introducing modes switched between an inside air introducing mode in which the inside air inlet port 65c is fully opened and the outside air inlet port 65d is fully closed and an outside air introducing mode in which the inside air inlet port 65c is fully closed and the outside air inlet port 65d is fully opened. The blower 65 is configured to allow the occupant to select either one of the inside and outside air introducing modes by turning a switch.

The casing 60 is provided inside an instrument panel (not shown) in the vehicle cabin. The casing 60 has a defroster blowout port 60a, a vent blowout port 60b, and a heat blowout port 60c. The defroster blowout port 60a is provided to supply the air-conditioning air to the inner surface of the windshield in the vehicle cabin. The vent blowout port 60b is provided to supply the air-conditioning air to mainly the upper body of the occupant in the vehicle cabin. The heat blowout port 60c is provided to supply the air-conditioning air to the feet of the occupant in the cabin.

These blowout ports 60a-60c are each opened and closed by an associated one of the blowout-mode switching doors 64. Although not shown, the blowout-mode switching doors 64 are operated by an actuator connected to the air-conditioning controller 22.

Examples of the blowout modes include a defroster blowout mode in which the air-conditioning air is supplied to the defroster blowout port 60a, a vent blowout mode in which the air-conditioning air is supplied to the vent blowout port 60b, a heat blowout mode in which the air-conditioning air is supplied to the heat blowout port 60c, a defroster/heat mode in which the air-conditioning air is supplied to the defroster blowout port 60a and the heat blowout port 60c, and a bi-level mode in which the air-conditioning air is supplied to the vent blowout port 60b and the heat blowout port 60c.

All of the air-conditioning air introduced into the casing 60 passes through the upstream interior heat exchanger 32.

In the casing 60, the air mix door 62 is provided between the upstream and downstream interior heat exchangers 32 and 31. The air mix door 62 is provided to control the temperature of the air-conditioning air such that the air that has passed through the upstream interior heat exchanger 32 which is going to pass through the downstream interior heat exchanger 31 has its flow rate changed to determine a mixing ratio between the air that has passed through the upstream interior heat exchanger 32 and the air that has passed through the downstream interior heat exchanger 31.

The PTC heater 67 is arranged downstream of the downstream interior heat exchanger 31 in the airflow direction inside the casing 60 in order to heat the air-conditioning air flowing inside the casing 60. The PTC heater 67 is controlled by the air-conditioning controller 22 so as to have its ON/OFF states switched and have the degree of heating changed. In this embodiment, the degree of heating is supposed to be changed from one of the three stages of Lo (low), Mi (middle) and Hi (high) into another. However, the degree of heating may also be changed in a larger number of stages or may even be changed stagelessly. The PTC heater 67 is supplied with electric power from the traction battery.

The vehicle air conditioner 1 further includes an outside air temperature sensor 70, an exterior heat exchanger temperature sensor 71, an interior heat exchanger temperature sensor 73, an inside air temperature sensor 75, and an exterior refrigerant temperature sensor (inlet-side refrigerant temperature detecting means) 83. These sensors are connected to the air-conditioning controller 22.

The outside air temperature sensor 70 is provided upstream of the exterior heat exchanger 33 in the airflow direction in order to detect the temperature of the outside air (outside air temperature) that has not entered the exterior heat exchanger 33 yet. On the other hand, the exterior heat exchanger temperature sensor 71 is arranged on a surface of the exterior heat exchanger 33 which is located downstream in the airflow direction in order to detect a surface temperature of the exterior heat exchanger 33.

The interior heat exchanger temperature sensor 73 is provided downstream of the upstream interior heat exchanger 32 in the airflow direction in order to detect a surface temperature of the upstream interior heat exchanger 32.

The inside air temperature sensor 75 is provided to detect the temperature inside the vehicle cabin (the inside air temperature) and is arranged at a predetermined position inside the vehicle cabin. The inside air temperature sensor 75 is a sensor that has been known in the art, and a detailed description thereof will be omitted herein.

The exterior refrigerant temperature sensor 83 is provided for the refrigerant inlet pipe 33h of the exterior heat exchanger 33 to detect the temperature of the refrigerant in the refrigerant inlet pipe 33h of the exterior heat exchanger 33.

Although not shown, the vehicle air conditioner 1 also includes a solar radiation sensor and other kinds of sensors.

The air-conditioning controller 22 is configured to control the heat pump device 20 and other components by reference to multiple pieces of information including the temperature set by the occupant, the outside air temperature, the temperature inside the vehicle cabin, and the intensity of solar radiation. The air-conditioning controller 22 may be implemented as a well-known central processing unit (CPU), a ROM, or a RAM, for example. In addition, the air-conditioning controller 22 further controls the motor-driven compressor 30, the first and second fan motors 37b, 38b, and other members depending on the air-conditioning load.

As in an ordinary automatic air-conditioning control, the air-conditioning controller 22 controls, through a main routine, a switch of the operation modes of the heat pump device 20, the volume of the air to be blown by the blower 65, the degree of opening of the air mix door 62, a switch of the blowout modes, the motor-driven compressor 30, and the blower motor 65b. For example, the fan motors 37b, 38b are activated even if the motor-driven compressor 30 is at a stop, e.g., when the traction inverter or any other member needs to be cooled.

The heat pump device 20 has a plurality of operation modes including a heating operation mode and a defrosting operation mode. Although not described for this embodiment, the operation modes of the heat pump device 20 also include a cooling operation mode in which the downstream interior heat exchanger 31 is made to function as a radiator, the upstream interior heat exchanger 32 is made to function as a heat absorber, and the exterior heat exchanger 33 is made to function as a radiator.

Figure 4:
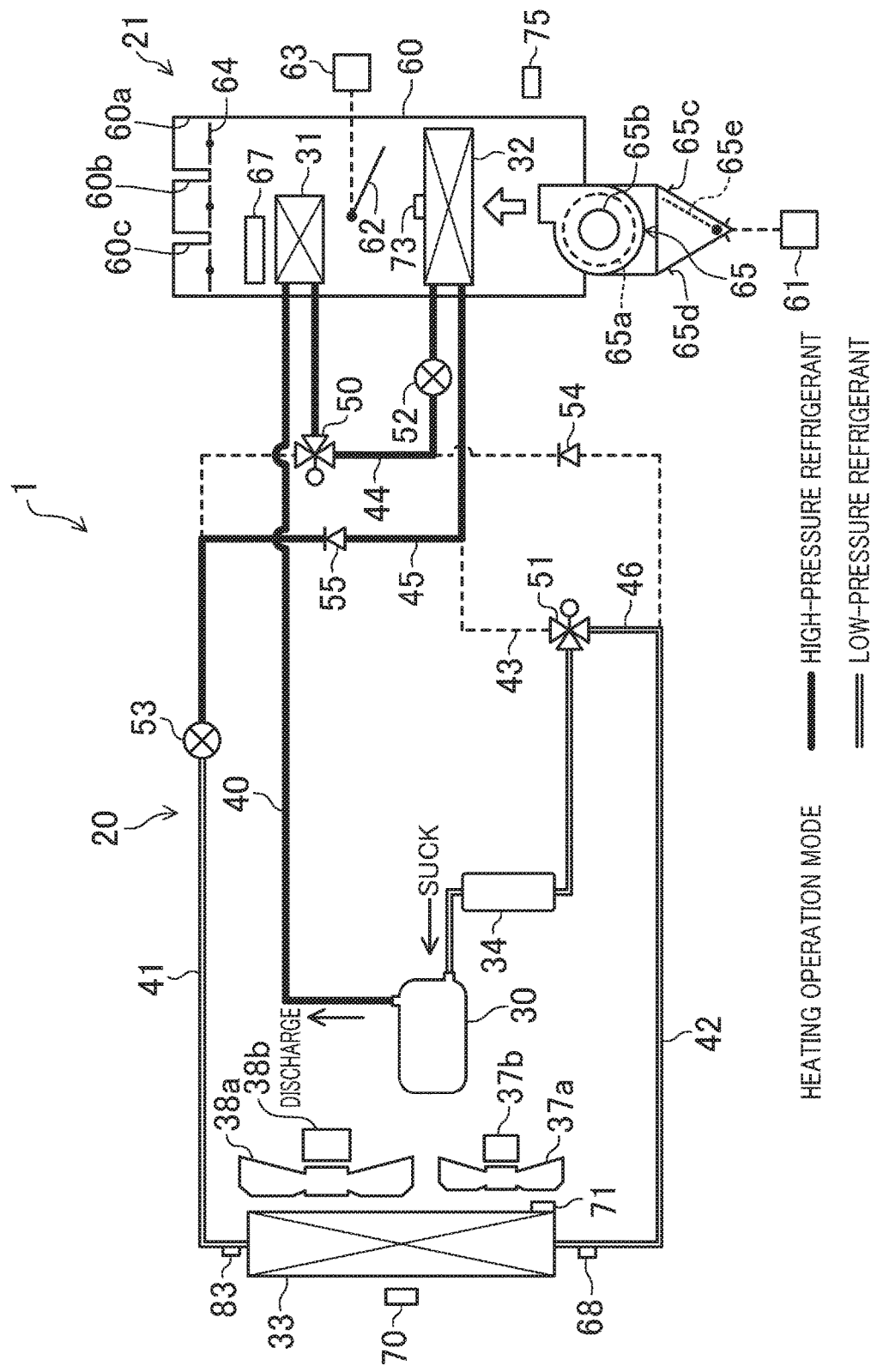
FIG. 4 is a diagram illustrating a heating mode of operation and corresponding to FIG. 1.

The heating operation mode shown in FIG. 4 is selected when the outside air temperature is lower than 0° C. (at an extremely-low outside air temperature), for example. In the heating operation mode, the downstream and upstream interior heat exchangers 31 and 32 are made to function as radiators, and the exterior heat exchanger 33 is made to function as a heat absorber.

Specifically, the first flow path switching valve 50 switches the flow paths such that the refrigerant that has flowed out of the downstream interior heat exchanger 31 flows into the upstream interior heat exchanger 32 through the inlet thereof. Meanwhile, the second flow path switching valve 51 switches the flow paths such that the refrigerant that has flowed out of the exterior heat exchanger 33 flows into the accumulator 34. The first expansion valve 52 is opened to turn into a non-expansion state, and the second expansion valve 53 is half-closed to turn into an expansion state.

If the motor-driven compressor 30 is activated in this state, the high-pressure refrigerant discharged from the motor-driven compressor 30 flows into the downstream interior heat exchanger 31 through the first main refrigerant pipe 40, and circulates through the downstream interior heat exchanger 31. The refrigerant that has circulated through the downstream interior heat exchanger 31 flows through the second main refrigerant pipe 41 into the upstream interior heat exchanger 32 via the first branch refrigerant pipe 44. Then, the refrigerant circulates through the upstream interior heat exchanger 32. That is, since the high-temperature refrigerant flows into the downstream and upstream interior heat exchangers 31 and 32, the air-conditioning air is heated by both of the downstream and upstream interior heat exchangers 31 and 32. As a result, a high heating capacity is achieved.

The refrigerant that has circulated through the upstream interior heat exchanger 32 flows through the fourth main refrigerant pipe 43 into the second main refrigerant pipe 41 via the second branch refrigerant pipe 45. The refrigerant that has flowed into the second main refrigerant pipe 41 expands by passing through the second expansion valve 53, and then flows into the exterior heat exchanger 33. The refrigerant that has flowed into the exterior heat exchanger 33 absorbs heat from the outside air. Then, the refrigerant passes through the third main refrigerant pipe 42 and the third branch refrigerant pipe 46 in this order, and is sucked into the motor-driven compressor 30 by way of the accumulator 34.

Figure 5:
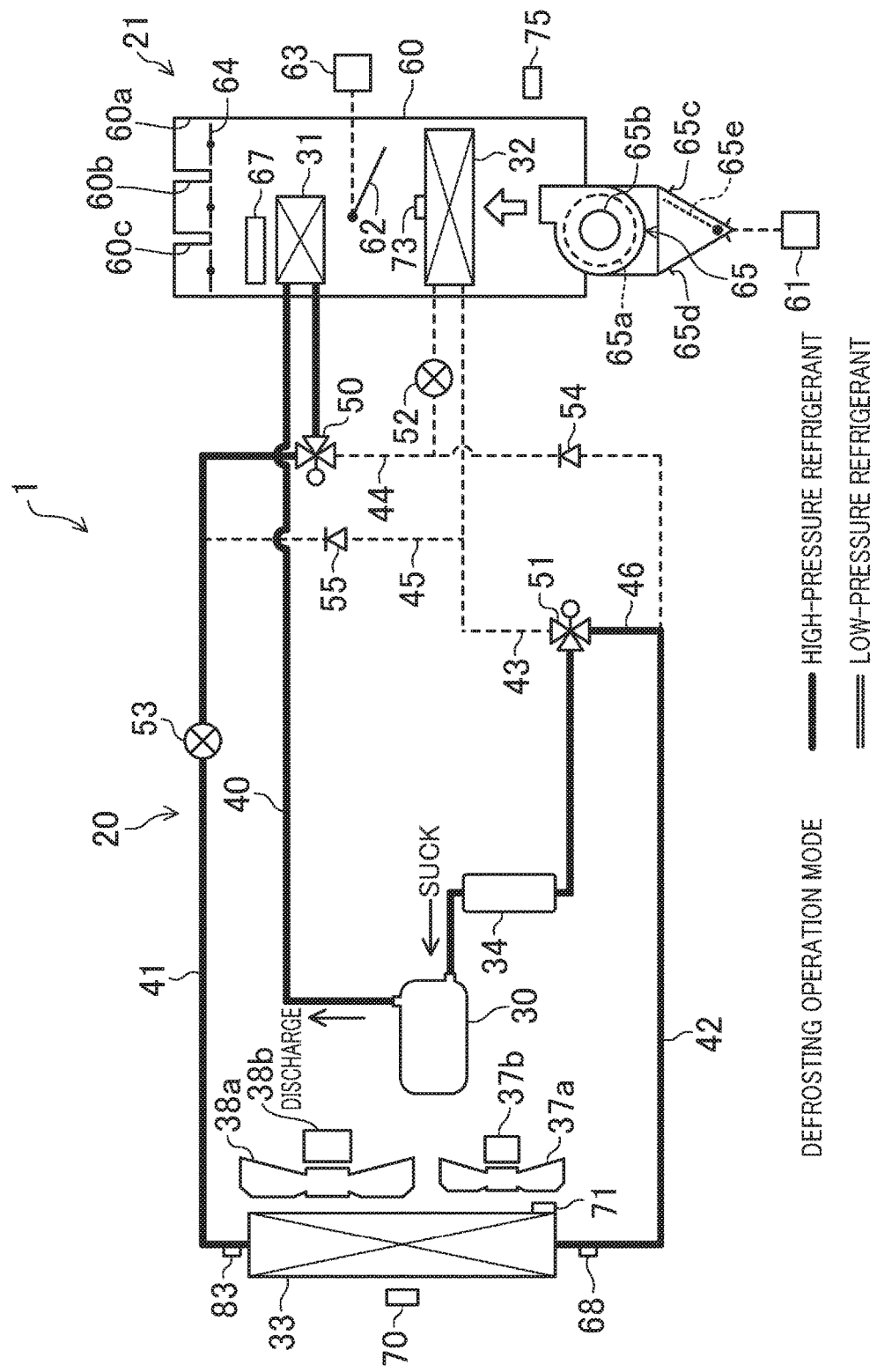
FIG. 5 is a diagram illustrating a defrosting mode of operation and corresponding to FIG. 1.

The defrosting operation mode shown in FIG. 5 is selected in order to melt the frost formed, if any, in the exterior heat exchanger 33 during heating. In the defrosting operation mode, the downstream interior heat exchanger 31 and the exterior heat exchanger 33 are made to function as radiators, and no refrigerant is allowed to flow through the upstream interior heat exchanger 32.

Specifically, the first flow path switching valve 50 switches the flow paths so as to prevent the refrigerant that has flowed out of the downstream interior heat exchanger 31 from flowing into the upstream interior heat exchanger 32 through its inlet and to allow the refrigerant to flow toward the second expansion valve 53. Meanwhile, the second flow path switching valve 51 switches the flow paths so as to allow the refrigerant that has flowed out of the exterior heat exchanger 33 to flow into the accumulator 34. The second expansion valve 53 is turned into the non-expansion state.

If the motor-driven compressor 30 is activated in this state, the refrigerant discharged from the motor-driven compressor 30 circulates through the downstream interior heat exchanger 31, and then flows into the exterior heat exchanger 33 without expanding by passing through the second main refrigerant pipe 41. The refrigerant that has flowed into the exterior heat exchanger 33 dissipates heat to melt the frost there. Thereafter, the refrigerant passes through the third main refrigerant pipe 42 and the third branch refrigerant pipe 46 in this order and then is sucked into the motor-driven compressor 30 via the accumulator 34.

Figure 2:
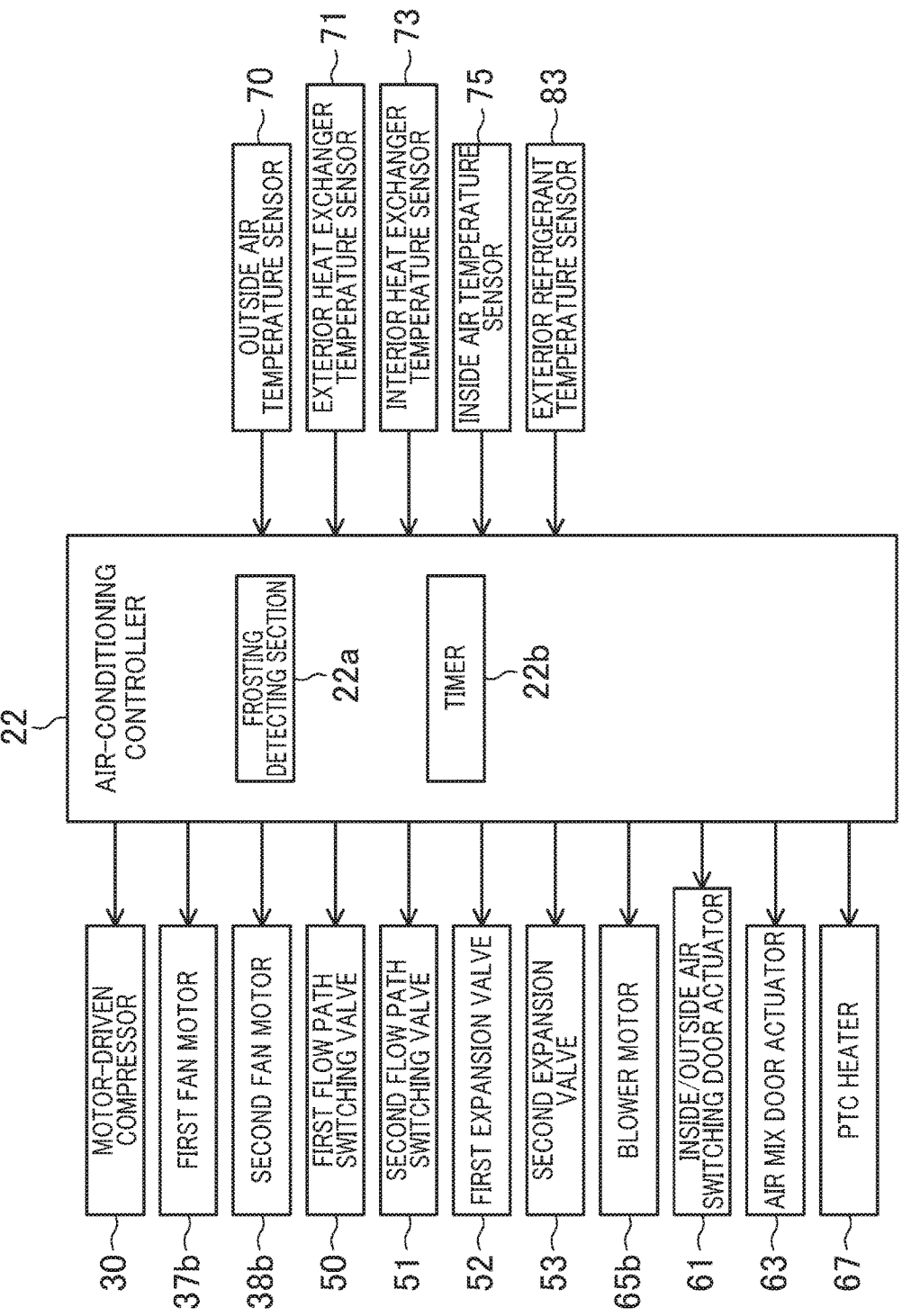
FIG. 2 is a block diagram of the vehicle air conditioner.

As shown in FIG. 2, the air-conditioning controller 22 includes a frosting detecting section (frosting state detecting means) 22a which determines whether or not frost has been formed in the exterior heat exchanger 33 and how much frost has been formed there, if any. The frosting detecting section 22a is configured to determine whether or not frost has been formed in the exterior heat exchanger 33 by making the exterior refrigerant temperature sensor 83 detect the temperature of the refrigerant in the refrigerant inlet pipe 33h of the exterior heat exchanger 33. Specifically, in the normal heating operation mode, the temperature of the refrigerant in the refrigerant inlet pipe 33h of the exterior heat exchanger 33 may be approximately −5° C., for example. In this embodiment, when the temperature of the refrigerant in the refrigerant inlet pipe 33h is sensed to have decreased to −8° C., for example, the decision is made that frost has been formed in the exterior heat exchanger 33. The decision may be made that the lower the temperature of the refrigerant in the refrigerant inlet pipe 33h, the larger the amount of frost formed there should be.

Alternatively, the frosting detecting section 22a may also be configured to determine whether or not frost has been formed in the exterior heat exchanger 33 by making the outlet-side temperature sensor (outlet-side refrigerant temperature detecting means) 68 detect the temperature of the refrigerant in the outlet pipe 33i using the refrigerant in the exterior heat exchanger 33, for example. Even so, the decision may also be made in the same way as in a situation where the temperature is detected by the exterior refrigerant temperature sensor 83.

The target blowout temperature of the air being blown out from the interior air-conditioning unit 21 is calculated by the air-conditioning controller 22 based on the temperature set by the occupant and the outside air temperature, for example.

Next, the procedure of control to be performed by the air-conditioning controller 22 will be described. Although not shown, in the main routine, if the outside air temperature (TG) detected by the outside air temperature sensor 70 is lower than 0° C., for example, the operation modes of the heat pump device 20 are switched into the heating operation mode. Also, the air-mix door 62 is operated so that the temperature of the blown air becomes as high as the target temperature.

If the outside air temperature (TG) is within the range of 0° C. to 25° C., for example, the air-conditioning controller 22 allows for performing heating while dehumidifying. However, if the outside air temperature (TG) is higher than 25° C., for example, then the operation modes of the heat pump device 20 are switched into the cooling operation mode.

Figure 6:
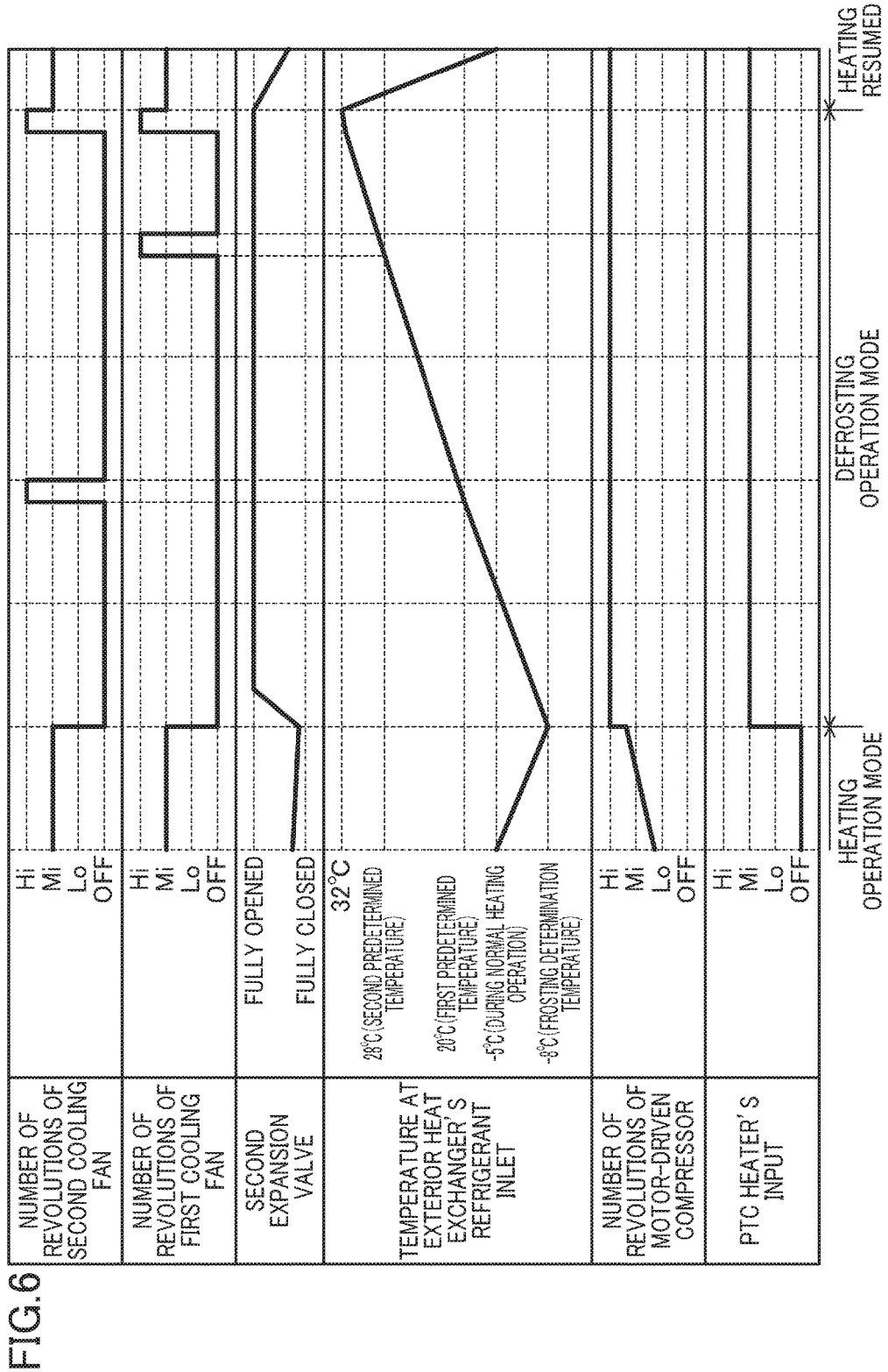
FIG. 6 is a timing diagram showing the contents of control performed by the vehicle air conditioner.

If the heating operation mode has been selected in the main routine, the operation modes of the heat pump device 20 are changed into the heating operation mode. In the heating operation mode, the number of revolutions of the first and second cooling fans 37a, 38a may be set to be the middle, for example, as in the timing diagram shown in FIG. 6. However, the number of revolutions of the first and second cooling fans 37a and 38a may be changed according to the air-conditioning load.

Also, since this is the heating operation mode, the second expansion valve 53 arranged upstream of the exterior heat exchanger 33 in the refrigerant flow direction is half-closed to cause adiabatic expansion of the refrigerant. In this case, the refrigerant in the refrigerant inlet pipe 33h of the exterior heat exchanger 33 may have a temperature of −5° C., for example.

Also, the number of revolutions of the motor-driven compressor 30 varies according to the air-conditioning load but is in the range of low to middle speeds. Furthermore, the PTC heater 67 is supposed to be OFF but may be turned ON as the case may be according to the air-conditioning load.

During the heating mode of operation, the exterior heat exchanger 33 frosts gradually. Although that frosting proceeds differently according to the configuration and operation state of the heat pump device 20, frosting proceeds in this embodiment from the refrigerant outlet toward the refrigerant inlet.

Then, during the heating mode of operation, the temperature of the refrigerant in the refrigerant inlet pipe 33h of the exterior heat exchanger 33 decreases gradually as shown in the timing diagram. During the heating mode of operation, the first and second cooling fans 37a and 38a are rotating, but the airflow rates of the first and second cooling fans 37a and 38a are set as described above. Thus, the flow rate of the air being blown by the second cooling fan 38a to pass through the paths P1 and P2 closer to the refrigerant inlet of the exterior heat exchanger 33 becomes higher than that of the air being blown by the first cooling fan 37a to pass through the paths P3 and P4 closer to the refrigerant outlet of the exterior heat exchanger 33. Consequently, the quantity of heat exchanged per unit time on the paths P1 and P2 closer to the refrigerant inlet becomes greater than that on the paths P3 and P4 closer to the refrigerant outlet. This thus allows for delaying the formation of frost on the paths P3 and P4 closer to the refrigerant outlet of the exterior heat exchanger 33, and eventually preventing the frost from growing over a broad range of the exterior heat exchanger 33.

When the temperature of the refrigerant in the refrigerant inlet pipe 33h reaches −8° C. that is the frosting determination temperature, the air-conditioning controller 22 decides that the exterior heat exchanger 33 is frosted, and changes the operation modes of the heat pump device 20 from the heating operation mode into the defrosting operation mode. That is to say, the second expansion valve 53 is fully opened. As a result, a non-expanded high-temperature refrigerant flows into the exterior heat exchanger 33 to start defrosting. Note that the frosting determination temperature does not have to be −8° C.

On the other hand, in the defrosting operation mode, the air-conditioning controller 22 stops the first and second cooling fans 37a, 38a to reduce the dissipation of heat by the exterior heat exchanger 33. Also, in the defrosting operation mode, the air-conditioning controller 22 sets the number of revolutions of the motor-driven compressor 30 to be higher than in the heating operation mode such that the compressor 30 runs at the maximum number of revolutions. Furthermore, the air-conditioning controller 22 turns the PTC heater 67 ON and sets the degree of heating to be medium, for example, thereby preventing the temperature of the air being blown out into the vehicle cabin from decreasing significantly. In this case, the flow rate of the air being blown by the blower 65 may be set to be lower than in the heating operation mode.

Once the operation modes have been switched into the defrosting operation mode, the temperature of the refrigerant in the refrigerant inlet pipe 33h of the exterior heat exchanger 33 rises gradually. When the temperature of the refrigerant in the refrigerant inlet pipe 33h exceeds 20° C. (first predetermined temperature), for example, it is estimated that the frost on the first and second paths P1 and P2 closer to the refrigerant inlet of the exterior heat exchanger 33 has melted to produce water outside the first and second paths P1 and P2. Thus, the second cooling fan 38a is activated for only a predetermined period of time. The number of revolutions of the second cooling fan 38a is set to be the maximum one. Also, the second cooling fan 38a may be activated for several seconds, for example. By making the second cooling fan 38a blow air against it, the water present outside the first and second paths P1 and P2 closer to the refrigerant inlet of the exterior heat exchanger 33 is blown off and drained. As a result, the quantity of heat removed from the refrigerant by the water present outside the first and second paths P1 and P2 may be reduced, thus allowing for supplying a high-temperature refrigerant to the third and fourth paths P3 and P4 downstream in the refrigerant flow direction.

After that, the temperature of the refrigerant in the refrigerant inlet pipe 33h of the exterior heat exchanger 33 further rises gradually. When the temperature of the refrigerant in the refrigerant inlet pipe 33h exceeds 28° C. (second predetermined temperature), for example, it is estimated that the frost on the third and fourth paths P3 and P4 closer to the refrigerant outlet of the exterior heat exchanger 33 has melted to produce water outside the third and fourth paths P3 and P4. In this case, the quantity of the water present outside the third and fourth paths P3 and P4 should be larger than that of the water present outside the first and second paths P1 and P2, because the third and fourth paths P3 and P4 will frost more easily than the first and second paths P1 and P2, as described above.

When the temperature of the refrigerant in the refrigerant inlet pipe 33h exceeds 28° C., for example, the first cooling fan 37a is rotated for only a predetermined period of time. The number of revolutions of the first cooling fan 37a is set to be the maximum one. Also, the first cooling fan 37a may be activated for several seconds, for example. By activating the first cooling fan 37a at the maximum number of revolutions, a greater quantity of air is blown against the exterior heat exchanger 33. This thus allows for blowing off, and draining, reliably the water present outside the third and fourth paths P3 and P4, even if there is much water there. Consequently, the quantity of heat removed from the high-temperature refrigerant by the outside water may be reduced, thus allowing for finishing defrosting in a shorter time.

In this embodiment, when the temperature of the refrigerant in the refrigerant inlet pipe 33h of the exterior heat exchanger 33 reaches 32° C., for example, the defrosting mode of operation is supposed to be finished to resume the heating mode of operation again. Before the temperature of the refrigerant in the refrigerant inlet pipe 33h of the exterior heat exchanger 33 reaches 32° C. (i.e., before the defrosting mode of operation is finished) and when it is estimated that almost all of the frost has already melted (e.g., when the temperature of the refrigerant in the refrigerant inlet pipe 33h reaches 31° C., for example), the first and second cooling fans 37a and 38a are activated at the maximum number of revolutions. In this manner, the water present outside the exterior heat exchanger 33 may be blown off entirely.

Thereafter, when the temperature of the refrigerant in the refrigerant inlet pipe 33h of the exterior heat exchanger 33 reaches 32° C., for example, the heating mode of operation is resumed again. In the heating operation mode, the number of revolutions of the first and second cooling fans 37a and 38a is set to be middle, and the second expansion valve 53 is half-closed. As a result, the temperature of the refrigerant in the refrigerant inlet pipe 33h of the exterior heat exchanger 33 decreases gradually. Also, right after the heating mode of operation has been resumed, the motor-driven compressor 30 is run at the maximum number of revolutions, and heating by the PTC heater 67 is continued, for a predetermined period of time. This thus prevents the temperature of the air being blown out into the vehicle cabin from decreasing significantly.

As can be seen from the foregoing description, in the vehicle air conditioner 1 according to this first embodiment, if the third and fourth paths P3 and P4 closer to the refrigerant outlet of the exterior heat exchanger 33 frost more easily than the first and second paths P1 and P2 closer to the refrigerant inlet thereof due to absorption of heat into the exterior heat exchanger 33 in the heating operation mode, the flow rate of the air being blown by the second cooling fan 38a to pass through the first and second paths P1 and P2 is set to be higher than that of the air being blown by the first cooling fan 37a to pass through the third and fourth paths P3 and P4. This thus allows for delaying the formation of frost on the third and fourth paths P3 and P4 closer to the refrigerant outlet of the exterior heat exchanger 33, improving the heating capacity, and eventually increasing the occupant's comfortableness.

In addition, this also allows for blowing off reliably the water present outside the first and second paths P1 and P2 closer to the refrigerant inlet of the exterior heat exchanger 33. This reduces the quantity of heat removed by that outside water from the high-temperature refrigerant flowing through the heat-transfer pipes 33a and shortens the time for defrosting, thus allowing for increasing the occupant's comfortableness.

Besides, the first and second cooling fans 37a and 38a are activated independently of each other according to the degree of defrosting of the exterior heat exchanger 33 during the defrosting mode of operation. This allows for draining efficiently the water present outside the exterior heat exchanger 33, thus improving the heating performance when frosting and defrosting occur recurrently during its operation.

If the temperature of the refrigerant in a region closer to the refrigerant inlet of the exterior heat exchanger 33 has risen to exceed a first predetermined temperature (of 20° C., for example), then the frost on the first and second paths P1 and P2 closer to the refrigerant inlet is estimated to have melted. In that case, by keeping the second cooling fan 38a activated for a predetermined period of time, the water present outside the first and second paths P1 and P2 may be blown off. This thus allows for defrosting the third and fourth paths P3 and P4 quickly by supplying a high-temperature refrigerant to the third and fourth paths P3 and P4 quickly.

Meanwhile, if the temperature of the refrigerant in a region closer to the refrigerant inlet of the exterior heat exchanger 33 has risen to exceed a second predetermined temperature (of 28° C., for example), then the frost on the third and fourth paths P3 and P4 is estimated to have melted, too. In that case, by keeping the first cooling fan 37a activated for a predetermined period of time, the water present outside the third and fourth paths P3 and P4 may be blown off.

In addition, since the exterior refrigerant temperature sensor 83 for detecting the refrigerant temperature state in a region closer to the refrigerant inlet of the exterior heat exchanger 33 is used as a frosting state detecting means, the first and second cooling fans 37a and 38a are controllable with an inexpensive configuration.

Furthermore, if this air conditioner is configured such that the refrigerant temperature state in a region closer to the refrigerant outlet of the exterior heat exchanger 33 is detected by the outlet-side temperature sensor 68, the frosting states of the first to fourth paths P1-P4 of the exterior heat exchanger 33 are estimable accurately.

Moreover, as described above, there is a correlation between the frosting state of each path P1-P4 of the exterior heat exchanger 33 and the amount of time that has passed since the defrosting mode of operation was started. The defrosting proceeds mainly on the first and second paths P1 and P2 at the beginning of the defrosting mode of operation, but proceeds mainly on the third and fourth paths P3 and P4 when a certain amount of time passes since the start of the defrosting mode of operation. Optionally, as shown in FIG. 2, a timer 22b may be provided as a clocking means for recording the amount of time that has passed since the defrosting mode of operation was started for the air-conditioning controller 22. According to the present disclosure, the timer 22b is used as a frosting state detecting means. The air-conditioning controller 22 is configured to activate the first cooling fan 37a when the timer 22b senses the amount of time that has passed since the defrosting mode of operation was started exceed a first predetermined amount of time (i.e., the time it takes to allow defrosting to proceed on the first and second paths P1 and P2) and then stop the first cooling fan 37a, and to activate the second cooling fan 38a when the timer 22b senses the amount of time that has passed since the defrosting mode of operation was started exceed a second predetermined amount of time (i.e., the time it takes to allow defrosting to proceed on the third and fourth paths P3 and P4) that is longer than the first predetermined amount of time. By using such a timer 22b, the frosting state may be detected based on the correlation without detecting the refrigerant temperature or any other parameter, and the first and second cooling fans 37a and 38a are controllable at a reduced cost adaptively to the frosting state.

In addition, the first and second cooling fans 37a and 38a are activated before the operation modes of the heat pump device 20 are switched from the defrosting operation mode into the heating operation mode and after the frost on the exterior heat exchanger 33 has melted. Thus, the water present outside the exterior heat exchanger 33 may be blown off in a late stage of the defrosting mode of operation. This improves the heating performance while frosting and defrosting occur recurrently during the operation.

The heat pump device 20 is controlled such that when the heat pump device 20 operates in the defrosting operation mode, the first and second cooling fans 37a and 38a have a maximum airflow rate. This thus allows for blowing off reliably the water present outside the exterior heat exchanger 33.

Second Embodiment

Figure 7:
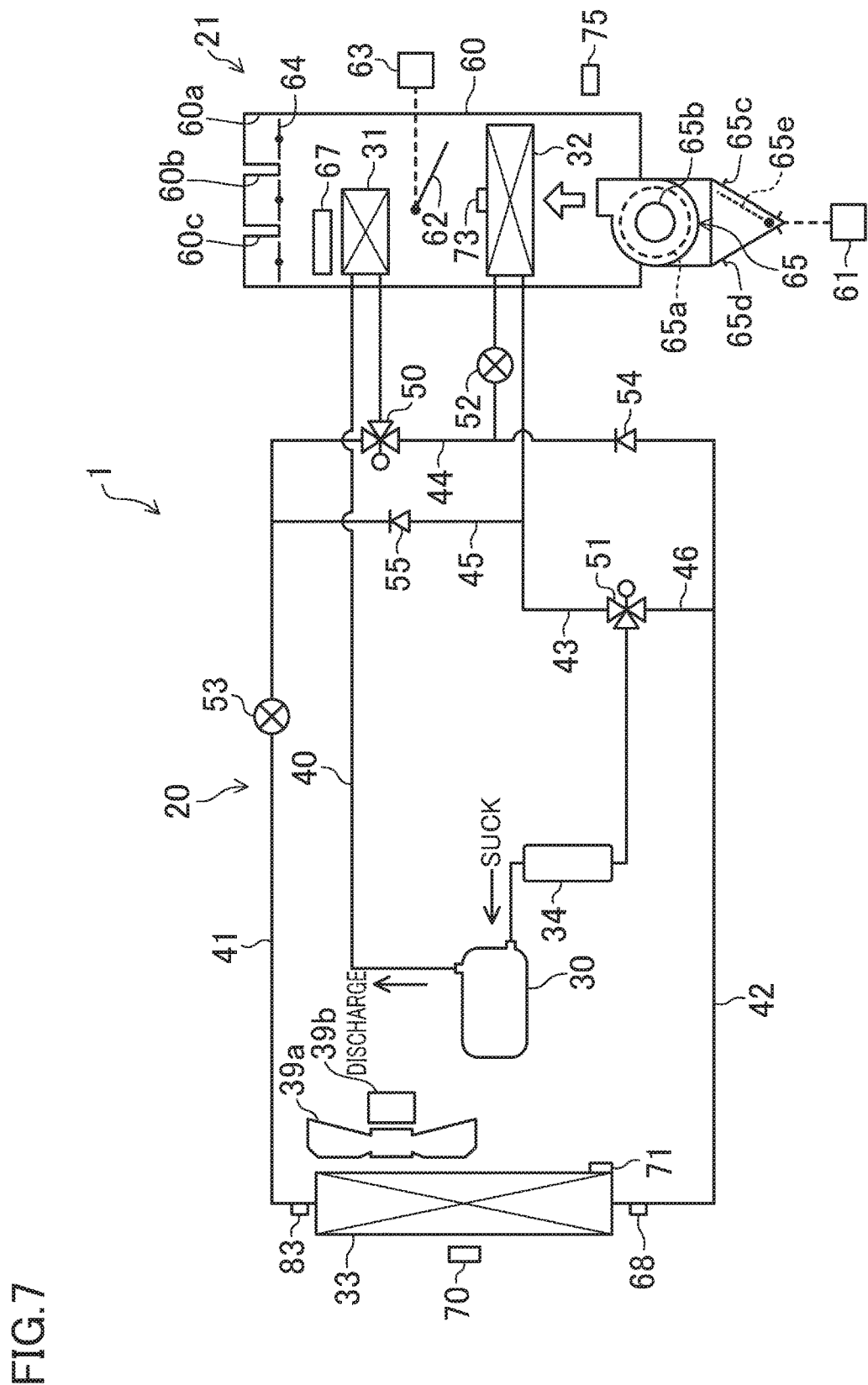
FIG. 7 is a diagram illustrating a second embodiment and corresponding to FIG. 1.
Figure 8:
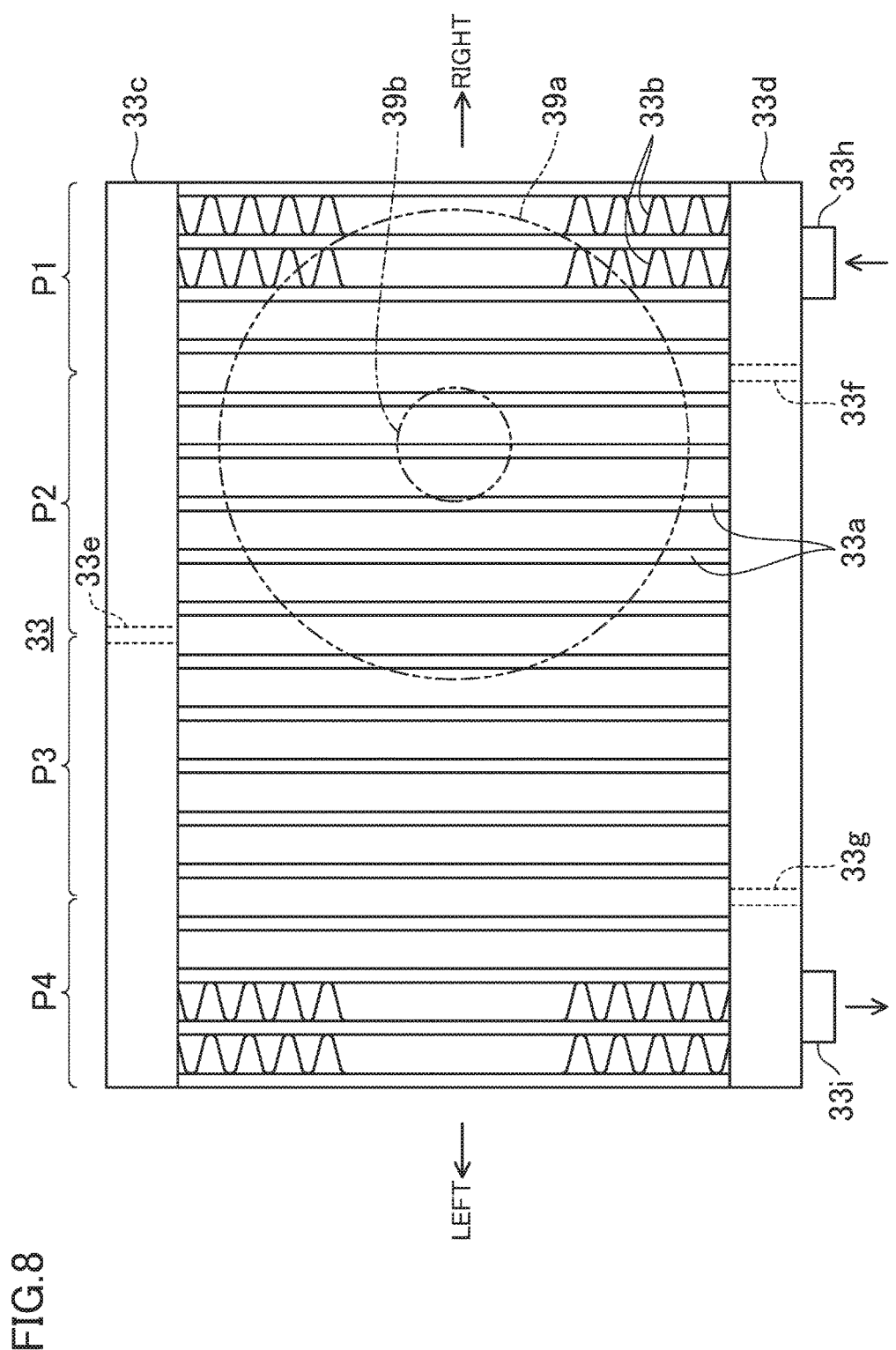
FIG. 8 is a view illustrating the second embodiment and corresponding to FIG. 3.

FIG. 7 illustrates a general configuration for a vehicle air conditioner 1 according to a second embodiment of the present disclosure. In this second embodiment, only one cooling fan 39a is provided as an exterior blower and thus the contents of the control are changed since there is only one cooling fan 39a, which is a difference from the first embodiment. However, since the second embodiment is the same as the first embodiment in the other respects, each of the other components of the second embodiment having the same function as their counterpart of the first embodiment described above is identified by the same reference numeral as their counterpart's and will not be described all over again, and the following description will be focused on that difference from the first embodiment.

The cooling fan 39a is provided such that the center of the cooling fan 39a is offset toward the refrigerant inlet with respect to the middle of the exterior heat exchanger 33 in the lateral direction of the vehicle. Thus, the flow rate of the air being blown by the cooling fan 39a to pass through the first and second paths P1 and P2 in a region closer to the refrigerant inlet of the exterior heat exchanger 33 is set to be higher than that of the air to pass through the third and fourth paths P3 and P4 in another region closer to the refrigerant outlet of the exterior heat exchanger 33.

The heating mode of operation is carried out in the same way as in the first embodiment except that the only one cooling fan 39a is used. During the heating mode of operation, the cooling fan 39a is arranged so as to be offset, and therefore, the flow rate of the air being blown by the cooling fan 39a to pass through the paths P1 and P2 closer to the refrigerant inlet of the exterior heat exchanger 33 becomes higher than that of the air being blown by the cooling fan 39a to pass through the paths P3 and P4 closer to the refrigerant outlet of the exterior heat exchanger 33. Consequently, the quantity of heat exchanged per unit time on the paths P1 and P2 closer to the refrigerant inlet becomes greater than that on the paths P3 and P4 closer to the refrigerant outlet. This thus allows for delaying the formation of frost on the paths P3 and P4 closer to the refrigerant outlet of the exterior heat exchanger 33, and eventually preventing the frost from growing over a broad range of the exterior heat exchanger 33.

Figure 9:
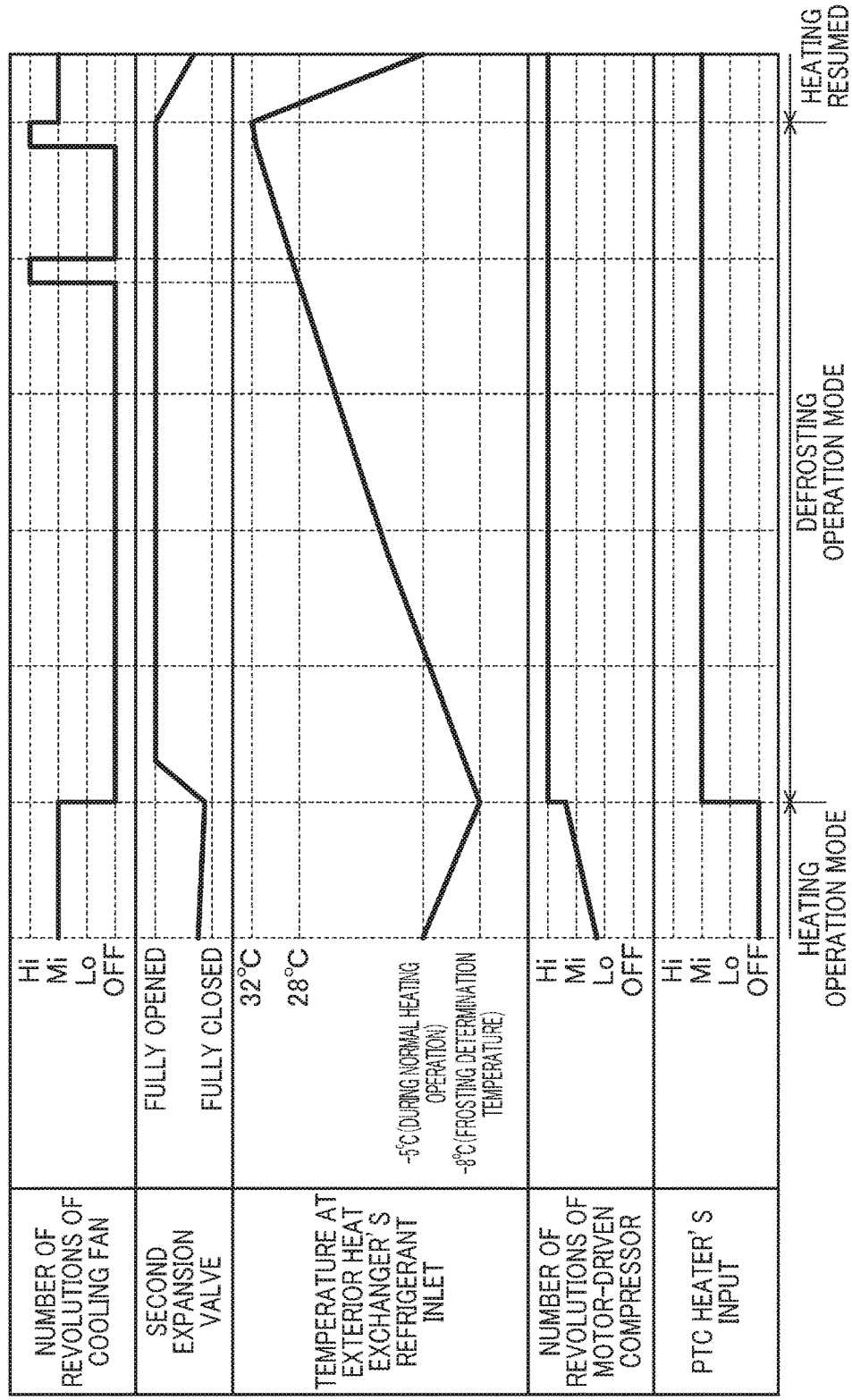
FIG. 9 is a diagram illustrating the second embodiment and corresponding to FIG. 6.

As shown in the timing diagram of FIG. 9, when the temperature of the refrigerant in the refrigerant inlet pipe 33h reaches a frosting determination temperature of −8° C. during the heating mode of operation, the air-conditioning controller 22 switches the operation modes of the heat pump device 20 from the heating operation mode into the defrosting operation mode.

Also, during the defrosting mode of operation, the air-conditioning controller 22 stops the cooling fan 39a to reduce the dissipation of heat by the exterior heat exchanger 33.

Once the operation modes have been switched into the defrosting operation mode, the temperature of the refrigerant in the refrigerant inlet pipe 33h of the exterior heat exchanger 33 rises gradually. When the temperature of the refrigerant in the refrigerant inlet pipe 33h exceeds 28° C., for example, it is estimated that the frost on the first and second paths P1 and P2 closer to the refrigerant inlet of the exterior heat exchanger 33 and the frost on the third and fourth paths P3 and P4 closer to the refrigerant outlet thereof have melted to produce water outside these paths. In this case, there is more water present outside the third and fourth paths P3 and P4 than outside the first and second paths P1 and P2.

When the temperature of the refrigerant in the refrigerant inlet pipe 33h exceeds 28° C., the cooling fan 39a is activated for only a predetermined period of time. The number of revolutions of the cooling fan 39a is set to be the maximum one. Also, the cooling fan 39a may be activated for several seconds, for example. By activating the cooling fan 39a at the maximum number of revolutions, the flow rate of the air being blown toward a region closer to the refrigerant inlet of the exterior heat exchanger 33 increases. Thus, even if there is a lot of water present outside, the water may be blown off and drained reliably. This reduces the quantity of heat removed by that outside water from the high-temperature refrigerant and shortens the time for defrosting.

Also, before the defrosting mode of operation ends and when it is estimated that the frost has melted almost entirely (i.e., when the temperature of the refrigerant in the refrigerant inlet pipe 33h reaches 31° C., for example), the cooling fan 39a is activated at the maximum number of revolutions. This thus allows for blowing off the water present outside the exterior heat exchanger 33.

Thereafter, when the temperature of the refrigerant in the refrigerant inlet pipe 33h of the exterior heat exchanger 33 reaches 32° C., for example, the heating mode of operation is resumed. In the heating mode of operation, the number of revolutions of the cooling fan 39a is set to be middle.

As can be seen from the foregoing description, in the vehicle air conditioner 1 according to this second embodiment, if the third and fourth paths P3 and P4 closer to the refrigerant outlet of the exterior heat exchanger 33 frost more easily than the first and second paths P1 and P2 closer to the refrigerant inlet thereof due to absorption of heat into the exterior heat exchanger 33 in the heating operation mode, the formation of frost on the third and fourth paths P3 and P4 closer to the refrigerant outlet of the exterior heat exchanger 33 may be delayed, because the cooling fan 39a is arranged to be offset toward the first and second paths P1 and P2. This thus improves the heating capacity and increases the occupant's comfortableness.

The number of paths provided for the exterior heat exchanger 33 does not have to be four, but may also be two, three, or five or more.

In the first and second embodiments described above, the flow velocity distribution of the exterior heat exchanger 33 is set in accordance with the locations of the cooling fans 37a, 38a and 39a such that the flow rate of the air being blown toward the paths P1 and P2 closer to the refrigerant inlet of the exterior heat exchanger 33 becomes higher than that of the air being blown toward the paths P3 and P4 closer to the refrigerant outlet of the exterior heat exchanger 33. However, this is only a non-limiting exemplary embodiment. Alternatively, the shapes of shrouds and ducts (not shown) may be modified such that the flow rate of the air being blown toward the paths P1 and P2 closer to the refrigerant inlet of the exterior heat exchanger 33 becomes higher than that of the air being blown toward the paths P3 and P4 closer to the refrigerant outlet of the exterior heat exchanger 33.

Note that each and every embodiment described above is just an example in any respect and should not be construed to be a limiting one. Besides, any variations or modifications falling within the range of equivalents to the claims to be described below are all encompassed within the scope of the present disclosure.

As can be seen from the foregoing description, a vehicle air conditioner 1 according to the present disclosure may be mounted on an electric vehicle and various other kinds of vehicles, for example.

What is claimed is:

1. A vehicle air conditioner comprising:
   a heat pump device including a compressor which compresses a refrigerant, an interior heat exchanger provided inside a vehicle cabin, an exterior heat exchanger provided outside the vehicle cabin, an expansion valve, and an exterior blower which blows air toward the exterior heat exchanger, the heat pump device being formed by connecting together the compressor, the interior heat exchanger, the expansion valve, and the exterior heat exchanger via refrigerant piping;
   an air-conditioning controller configured to control the heat pump device; and
   a frosting state detecting means for detecting a frosting state of the exterior heat exchanger,
   the heat pump device being configured to be switched by the air-conditioning controller between multiple operation modes including a heating operation mode and a defrosting operation mode, wherein
   the exterior heat exchanger includes a plurality of heat-transfer pipes which run vertically and are arranged side-by-side horizontally when installed and the vehicle is on level ground and a header tank which is connected to an end of the heat-transfer pipes and which extends horizontally,
   the header tank has a refrigerant inlet portion and a refrigerant outlet portion which are provided along the length of the header tank so as to be spaced apart from each other, and a partition which partitions the heat-transfer pipes into a plurality of paths such that a refrigerant flow that goes from the refrigerant inlet portion toward the refrigerant outlet portion is formed,
   the exterior blower includes a first fan and a second fan which are arranged horizontally along an air passage plane of the exterior heat exchanger so as to be located closer to the refrigerant outlet portion and the refrigerant inlet portion, respectively,
   the airflow rate of the second fan is set to be higher than the airflow rate of the first fan such that the flow rate of the air being blown by the second fan to pass through one of the paths closer to the refrigerant inlet portion of the exterior heat exchanger is higher than the flow rate of the air being blown by the first fan to pass through another one of the paths closer to the refrigerant outlet portion of the exterior heat exchanger than the one of the paths, and
   the air-conditioning controller is configured to switch, if the frosting state detecting means senses, during the heating mode of operation, that the exterior heat exchanger is frosted, the operation modes of the heat pump device into a defrosting operation mode in which the air-conditioning controller initially stops the first and second fans and then activates the first and second fans independently of each other according to the degree of defrosting of the exterior heat exchanger during the defrosting mode of operation.

2. The vehicle air conditioner of claim 1, wherein
   the frosting state detecting means includes an outlet-side refrigerant temperature detecting means for detecting a refrigerant temperature state in a region closer to the refrigerant outlet portion of the exterior heat exchanger than to the refrigerant inlet portion, and
   the air-conditioning controller is configured to activate the second fan when the refrigerant temperature detected by the outlet-side refrigerant temperature detecting means exceeds a first predetermined temperature and then stop the second fan, and to activate the first fan when the refrigerant temperature detected by the outlet-side refrigerant temperature detecting means exceeds a second predetermined temperature that is higher than the first predetermined temperature.

3. The vehicle air conditioner of claim 1, wherein
   the frosting state detecting means includes an inlet-side refrigerant temperature detecting means for detecting a refrigerant temperature state in a region closer to the refrigerant inlet portion of the exterior heat exchanger than to the refrigerant outlet portion, and
   the air-conditioning controller is configured to activate the second fan when the refrigerant temperature detected by the inlet-side refrigerant temperature detecting means exceeds a first predetermined temperature and then stop the second fan, and to activate the first fan when the refrigerant temperature detected by the inlet-side refrigerant temperature detecting means exceeds a second predetermined temperature that is higher than the first predetermined temperature.

4. The vehicle air conditioner of claim 1, wherein
   the frosting state detecting means includes a clocking means for recording the amount of time that has passed since the defrosting mode of operation was started, and
   the air-conditioning controller is configured to activate the second fan when the clocking means senses the amount of time that has passed since the defrosting mode of operation was started exceeds a first predetermined amount of time and then stop the second fan, and to activate the first fan when the clocking means senses the amount of time that has passed since the defrosting mode of operation was started exceed a second predetermined amount of time that is longer than the first predetermined amount of time.

5. The vehicle air conditioner of claim 1, wherein
   the air-conditioning controller is configured to activate the exterior blower before the operation modes of the heat pump device are switched from the defrosting operation mode into the heating operation mode and after it has been estimated that the frost on the exterior heat exchanger has melted.

6. The vehicle air conditioner of claim 1, wherein
the air-conditioning controller controls the heat pump device such that when the heat pump device operates in the defrosting operation mode, the exterior blower has a maximum airflow rate.

7. The vehicle air conditioner of claim 1, wherein
the heat pump device includes a first interior heat exchanger and a second interior heat exchanger which is arranged upstream of the first interior heat exchanger in an airflow direction, and
the heat pump device makes the first and second interior heat exchangers function as radiators during the heating mode of operation.

* * * * *